(12) United States Patent
Ikkanzaka (10) Patent No.: US 9,154,666 B2
(45) Date of Patent: Oct. 6, 2015

(54) IMAGE PROCESSING SYSTEM AND IMAGE PROCESSING METHOD

(71) Applicant: Hiroaki Ikkanzaka, Tokyo (JP)

(72) Inventor: Hiroaki Ikkanzaka, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/534,748

(22) Filed: Nov. 6, 2014

(65) Prior Publication Data

US 2015/0146233 A1 May 28, 2015

(30) Foreign Application Priority Data

Nov. 26, 2013 (JP) ................................. 2013-244062
Jul. 18, 2014 (JP) ................................. 2014-148049

(51) Int. Cl.
*H04N 1/44* (2006.01)
*H04N 1/32* (2006.01)
*H04N 1/00* (2006.01)

(52) U.S. Cl.
CPC ............ *H04N 1/444* (2013.01); *H04N 1/00244* (2013.01); *H04N 1/32363* (2013.01); *H04N 1/4426* (2013.01); *H04N 2201/0094* (2013.01)

(58) Field of Classification Search
USPC ............. 358/1.1, 1.13, 1.14, 1.15, 1.16, 1.18, 358/3.28
See application file for complete search history.

(56) References Cited

U.S. PATENT DOCUMENTS

| 8,953,203 B2* | 2/2015 | Tomi ............................ 358/1.15 |
| 2011/0310423 A1* | 12/2011 | Motosugi et al. ............. 358/1.13 |
| 2014/0153039 A1* | 6/2014 | Sasase .......................... 358/1.15 |

FOREIGN PATENT DOCUMENTS

| JP | 2004-276534 | 10/2004 |
| JP | 2007-108976 | 4/2007 |
| JP | 2009-140412 | 6/2009 |

* cited by examiner

*Primary Examiner* — Allen H Nguyen
(74) *Attorney, Agent, or Firm* — Oblon, McClelland, Maier & Neustadt, L.L.P.

(57) ABSTRACT

An image processing system includes a server device and an image processing device connected to the server device via a network. The image processing device includes a reading unit that reads out a document to obtain document information; and a print unit that prints the document information. The server device includes a storage unit that stores the document information and first positional information in association with each other, the first positional information indicating a position of the reading unit that has read out the document information; a communication unit that receives a print request including information for identifying the document information and second positional information that indicates a position of the print unit that prints the document information; and a determination unit that permits printing of the document information when at least a part of the first positional information matches with at least a part of the second positional information.

7 Claims, 6 Drawing Sheets

○○○ Co., Ltd.

△△ DEPARTMENT
        TARO YAMADA

3F, A BUILDING, CHUO-KU,
TOKYO, 123-4567, JAPAN
TEL: 012-345-××××

| DOCUMENT IDENTIFYING INFORMATION | OBTAINMENT POSITION INFORMATION | PRINT AVAILABLE POSITION INFORMATION | CONFIDENTIAL INFORMATION |
|---|---|---|---|
| BUSINESS CARD INFORMATION 001 | 1F, A BUILDING, CHUO-KU, TOKYO | 1F TO 10F, A BUILDING, CHUO-KU, TOKYO | TARO YAMADA 012-345-×××× |
| ⋮ | ⋮ | ⋮ | ⋮ |

IMAGE PROCESSING SYSTEM AND IMAGE PROCESSING METHOD

CROSS-REFERENCE TO RELATED APPLICATIONS

The present application claims priority to and incorporates by reference the entire contents of Japanese Patent Application No. 2013-244062 filed in Japan on Nov. 26, 2013 and Japanese Patent Application No. 2014-148049 filed in Japan on Jul. 18, 2014.

BACKGROUND OF THE INVENTION

1. Field of the Invention

The present invention relates to an image processing system and an image processing method.

2. Description of the Related Art

An image processing system provided with an image processing device such as a multi function printer (MFP) and an information processing device has been utilized. Besides, a technique of storing document information read out from a document by a reading device and controlling an access to the document information has been known. Japanese Laid-open Patent Publication No. 2007-108976 discloses an information processing device that controls an access to information included in a business card image obtained by scanning a business card to prevent a leakage of personal information, for example.

However, such a conventional technique as explained above is at high risk for a leakage of confidential information such as personal information included in document information because the document information stored in an information processing device and the like can be printed by an arbitrary image processing device.

Therefore, there is a need for an image processing system and an image processing method which are capable of suppressing a risk for a leakage of confidential information included in document information.

SUMMARY OF THE INVENTION

It is an object of the present invention to at least partially solve the problems in the conventional technology.

According to an embodiment, there is provided an image processing system that includes a server device and an image processing device connected to the server device via a network. The image processing device includes a reading unit that reads out a document to obtain document information; and a print unit that prints the document information. The server device includes a storage unit that stores the document information and first positional information in association with each other, the first positional information indicating a position of the reading unit that has read out the document information; a communication unit that receives a print request including information for identifying the document information and second positional information that indicates a position of the print unit that prints the document information; and a determination unit that permits printing of the document information when at least a part of the first positional information matches with at least a part of the second positional information.

According to another embodiment, there is provided an image processing method performed in an image processing system that includes a server device and an image processing device connected to the server device via a network. The image processing method includes reading out a document to obtain document information by a reading unit of the image processing device; storing, in a storage unit of the server device, the document information and first positional information in association with each other, the first positional information indicating a position of the reading unit that has read out the document information; printing the document information by a print unit of the image processing device; receiving, by a communication unit of the server device, a print request including information for identifying the document information and second positional information that indicates a position of the print unit that prints the document information; and permitting, by a determination unit of the server device, the printing of the document information when at least a part of the first positional information matches with at least a part of the second positional information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing system and an image processing method will be explained in detail below with reference to the accompanying drawings.

First Embodiment

Figure 1:
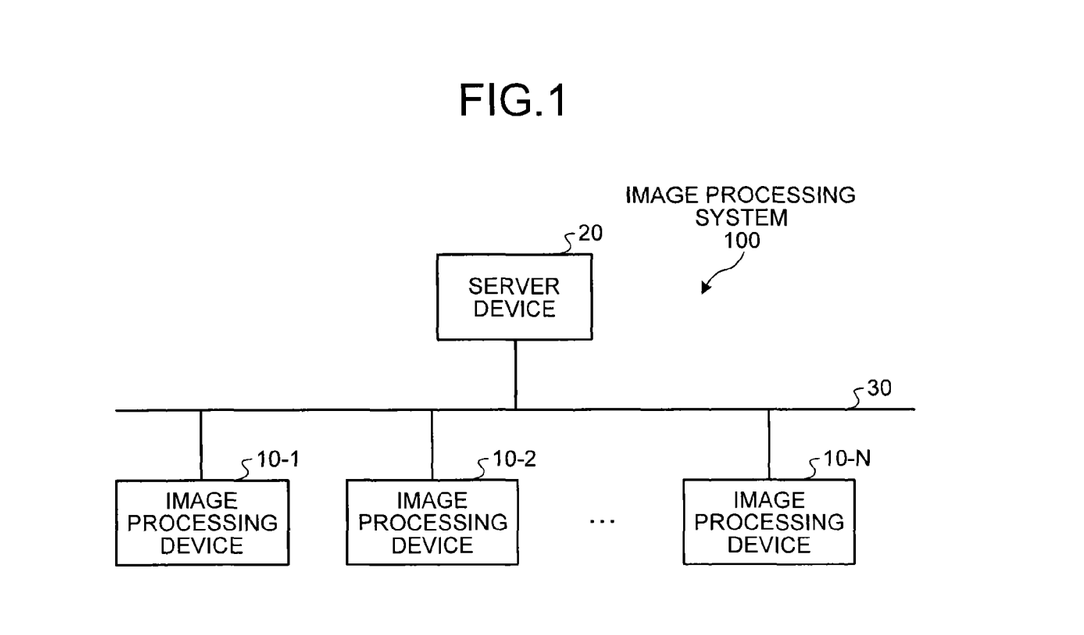
FIG. 1 illustrates an example of an image processing system according to a first embodiment.

FIG. 1 illustrates an example of an image processing system 100 according to a first embodiment. The image processing system 100 according to the first embodiment is provided with an image processing devices 10-1, 10-2, . . . , and 10-N ("N" being an integer equal to or more than one) and a server device 20. The image processing devices 10-1, 10-2, . . . , and 10-N and the server device 20 are connected to each other via a network 30. A communication method of the network 30 may be a wired method or a wireless method. Moreover, the network 30 may be realized in combination with a wired method and a wireless method. The image processing devices 10-1, 10-2, ..., and 10-N are hereinafter simply referred to as "image processing device 10" when there is no necessity of discrimination thereamong.

Figure 2:
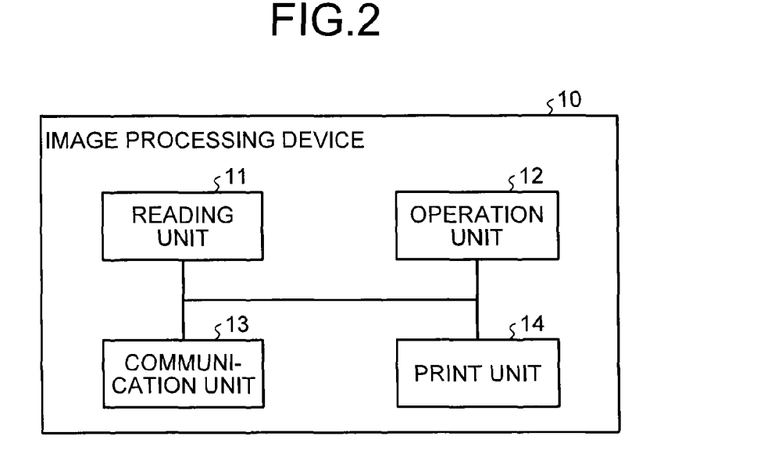
FIG. 2 illustrates an example of an image processing device according to the first embodiment.

FIG. 2 illustrates an example of the image processing device 10 according to the first embodiment. The image processing device 10 according to the first embodiment is provided with a reading unit 11, an operation unit 12, a communication unit 13, and a print unit 14. The image processing device 10 is an MFP, for example.

Figure 3:
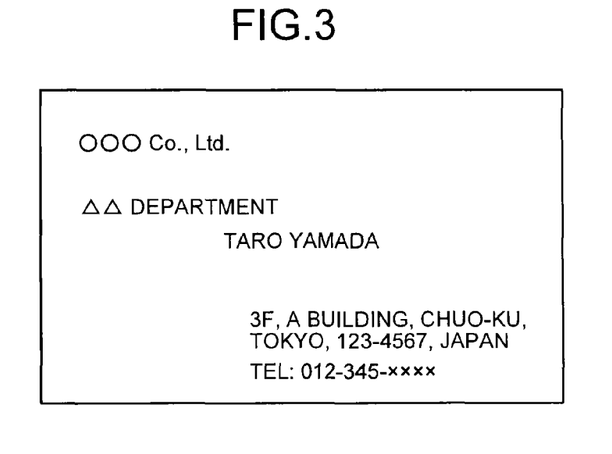
FIG. 3 illustrates an example of a document to be read out by a reading unit according to the first embodiment.

The reading unit 11 reads out a document to obtain document information. FIG. 3 illustrates an example of a document to be read out by the reading unit 11 according to the first embodiment. FIG. 3 illustrates an example where the document is a business card. The reading unit 11 obtains document information including a company name, a department, a name, a zip code, an address, and a telephone number from the document (business card) in FIG. 3.

With reference to FIG. 2 again, the operation unit 12 receives an input that indicates whether to associate positional information (hereinafter referred to as "first positional information") indicating a position of the reading unit 11 (the image processing device 10) that read out the document information with the document information. The operation unit 12 also receives an input that indicates a range of the positional information when a user specifies the range of the positional information of the print unit 14 (the image processing unit 10) which is permitted to print the document information. When a user specifies confidential information that indicates information of a part whose printing is not permitted in the document information, the operation unit 12 also receives an input that specifies the confidential information. The confidential information, when the printing thereof is not permitted in the determination by the server device 20 (a determination unit 23), which will be explained later, is to be printed by disabling an identification of the confidential information in printing. When the printing is not permitted in the determination, the confidential information is filled in printing, for example. When a user prints document information stored in the server device 20, which will be explained later, the operation unit 12 receives an input that specifies document information as a print target. The document information as a print target may be instructed from an information processing device that the user uses.

The communication unit 13 transmits the document information read out by the reading unit 11 to the server device 20. When the operation unit 12 receives the input that indicates the association of the first positional information indicating the position of the reading unit 11 that read out the document information with the document information, the communication unit 13 transmits, to the server device 20, the first positional information indicating the position of the reading unit 11 that read out the document information together with the document information. Here, the communication unit 13 may dynamically obtain the first positional information by using a global positioning system (GPS) or may obtain the first positional information that is set in advance in the image processing device 10.

When the operation unit 12 receives the input that indicates the range of the positional information of the print unit 14 which is permitted to print the document information, the communication unit 13 transmits, to the server device 20, information indicating the range of the positional information together with the document information. When the operation unit 12 receives the input that specifies confidential information, the communication unit 13 transmits the confidential information together with the document information to the server device 20.

When the operation unit 12 receives the input that specifies document information as a print target, the communication unit 13 transmits a print request to the server device 20. The print request includes information identifying the document information as a print target and positional information (hereinafter referred to "second positional information") indicating a position of the print unit 14 (the image processing device 10) that prints the document information. The information identifying the document information as a print target is, for example, a file name of the document information.

The print unit 14 prints document information stored in the server device 20, which will be explained later, in accordance with an instruction, by a user, of the document information as a print target.

Figure 4:
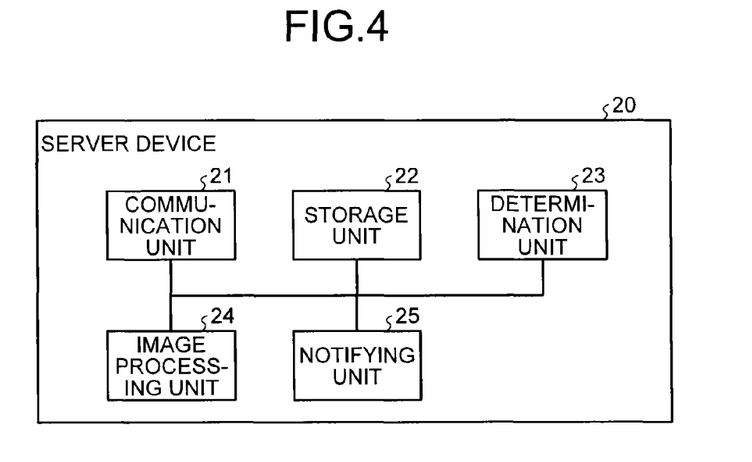
FIG. 4 illustrates an example of a server device according to the first embodiment.

FIG. 4 illustrates an example of the server device 20 according to the first embodiment. The server device 20 according to the first embodiment is provided with a communication unit 21, a storage unit 22, a determination unit 23, an image processing unit 24, and a notifying unit 25. The server device 20 according to the first embodiment is an optical character reader (OCR) server device that stores document information read out by the image processing device 10.

When the image processing device 10 obtains document information, the communication unit 21 receives the document information from the image processing device 10. On this occasion, the communication unit 21 receives, in accordance with an operational input, by a user, of the image processing device 10, the first positional information indicating the position of the reading unit 11 that read out the document information, the information indicating the range of the positional information of the print unit 14 which is permitted to print the document information, and the confidential information together with the document information. The communication unit 21 stores, in the storage unit 22, the document information received from the image processing device 10, the first positional information indicating the position of the reading unit 11 that read out the document information, the information indicating the range of the positional information of the print unit 14 which is permitted to print the document information, and the confidential information.

The communication unit 21 receives a print request including the information identifying document information as a print target and the second positional information indicating the position of the print unit 14 that prints the document information. The communication unit 21 transmits, to the determination unit 23, the information identifying document information as a print target and the second positional information indicating the position of the print unit 14 that prints the document information.

When the determination unit 23, which will be explained later, permits printing of the document information, the communication unit 21 transmits the document information as a print target to the image processing device 10. When the determination unit 23 does not permit the printing of the document information and confidential information is specified in the document information, the communication unit 21 transmits, to the image processing device 10, document information on which an image processing is performed by the image processing unit 24 so that an identification of the confidential information is disabled.

Figure 5:
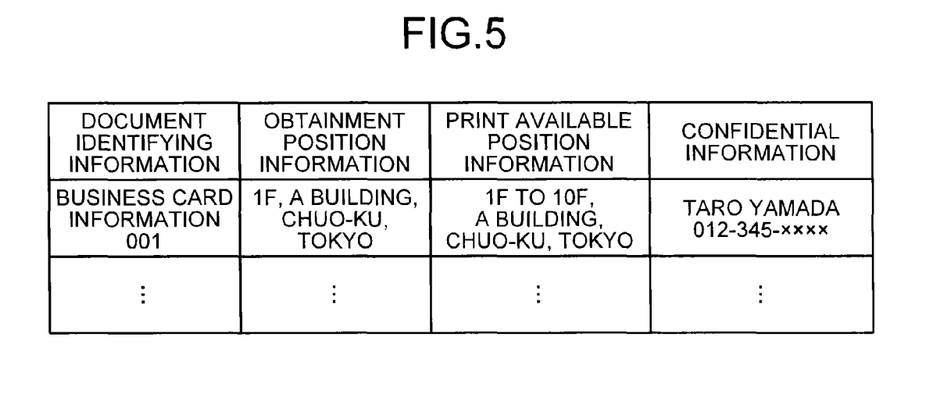
FIG. 5 illustrates an example of administration information according to the first embodiment.

The storage unit 22 stores document information read out by the image processing device 10 and administration information concerning the document information. FIG. 5 illustrates an example of administration information according to the first embodiment. Administration information according to the first embodiment includes document identifying information, obtainment position information, print available position information, and confidential information. The document identifying information allows identifying document information. The document identifying information is, for example, a file name of the document information. The obtainment position information corresponds to the first positional information indicating the position of the reading unit 11 that read out the document information. The print available position information indicates the range of the positional information of the print unit 14 which is permitted to print the document information. The confidential information is made unidentifiable in printing the document information by a user who is not permitted to print the document information.

The example in FIG. 5 illustrates administration information corresponding to document information of the document (business card) in FIG. 3. For the document identifying information, "business card information 001" is set. For the obtainment position information, "1F, A building, Chuo-ku, Tokyo" is set. For the print available position information, "1F to 10F, A building, Chuo-ku, Tokyo" is set. For the confidential information, "Taro Yamada" and "012-345-XXXX" are set.

With reference to FIG. 4 again, the determination unit 23 determines whether to permit the printing with reference to the administration information in the storage unit 22 when receiving the information identifying the document information as a print target and the second positional information indicating the position of the print unit 14 that prints the document information from the communication unit 21. Specifically, the determination unit 23 first searches the document identifying information of the administration information based on the information, received from the communication unit 21, identifying the document information as a print target and obtains the searched administration information (obtainment position information, print available position information, and confidential information). When there is no obtainment position information in the searched administration information, the determination unit 23 permits the printing.

Next, when the obtainment position information is present in the searched administration information, the determination unit 23 determines whether or not a part or all of the second positional information that indicates the position of the print unit 14 that prints the document information corresponds to a part or all of the obtainment position information. When there is a matching in a part or all, the determination unit 23 permits the printing.

Here, a case of determining whether or not a part of the second positional information matches with a part of the obtainment position information will be explained. The determination unit 23 determines whether or not a part of the second positional information matches with a part of the obtainment position information by using a string of letters for determination as a part of the obtainment position information. The string of letters is preset for each piece of document information as setting information of the server device 20, for example. When the string of letters of the document information as a print target is "A building, Chuo-ku, Tokyo", the second positional information is "1F, A building, Chuo-ku, Tokyo", and the obtainment position information is "3F, A building, Chuo-ku, Tokyo", for example, a part of the second positional information matches with the string of letters "A building, Chuo-ku, Tokyo" as a part of the obtainment position information. The determination unit 23 therefore determines that a part of the second positional information matches with a part of the obtainment position information and permits the printing of the document information.

When there is no matching in a part or all, the determination unit 23 determines whether or not print available position information is present in the searched administration information. When print available position information is present in the searched administration information, the determination unit 23 determines whether or not the second positional information of the print unit 14 that prints the document information is included in the print available position information. When the second positional information of the print unit 14 that prints the document information is included in the print available position information, the determination unit 23 permits the printing.

Next, when the second positional information of the print unit 14 that prints the document information is not included in the print available position information, the determination unit 23 does not permit the printing. When not permitting the printing, the determination unit 23 further determines whether or not confidential information is present in the searched administration information. When confidential information is present, the determination unit 23 asks the image processing unit 24, which will be explained later, for an image processing by which the confidential information is made unidentifiable. When no confidential information is present, the determination unit 23 asks the notifying unit 25, which will be explained later, for a processing of notifying that the printing is not permitted.

When the determination unit 23 does not permit the printing and confidential information is present in the document information, the image processing unit 24 performs an image processing so that the confidential information is made unidentifiable in the document information. The image processing unit 24 performs an OCR processing on the document information received by the communication unit 21 and stores the document information including letter data in the storage unit 22.

When the determination unit 23 does not permit the printing of the document information and confidential information is not present in the document information, the notifying unit 25 notifies the image processing device 10 of information of the print request in response to which the printing is not permitted. The user is thus able to recognize that the print request is not permitted. When the determination unit 23 does not permit the printing of the document information and no confidential information is present in the document information, the notifying unit 25 notifies a terminal of a manager of the image processing system 100 of the information of the print request in response to which the printing is not permitted. The manager is thus able to recognize that a print request is transmitted from a user who is not able to print the document information specified in the print request.

Figure 6:
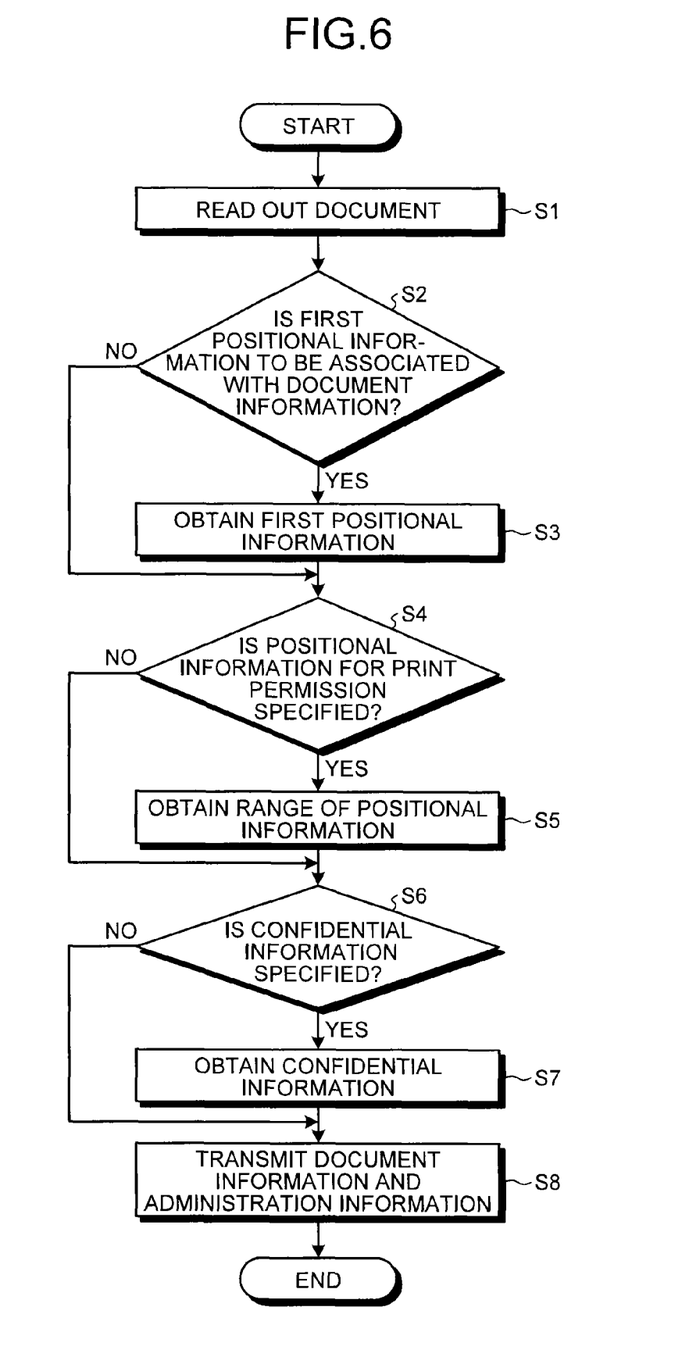
FIG. 6 is a flowchart of an example of a processing in reading out a document according to the first embodiment.

Next, an image processing method according to the first embodiment will be explained with reference to a flowchart. FIG. 6 is a flowchart of an example of a processing in reading out a document according to the first embodiment.

The reading unit 11 reads out a document to obtain document information (step S1). Next, the operation unit 12 determines whether or not an input that indicates whether to associate the first positional information indicating the position of the reading unit 11 (the image processing device 10) that read out the document information with the document information is received (step S2). When the input of associating the first positional information with the document information is received ("Yes" at step S2), the communication unit 13 uses the setting information or the GPS function of the image processing device 10 to obtain the first positional information of the reading unit 11 and associates the first positional information with the document information as administration information (step S3). When the input of associating the first positional information with the document information is not received ("No" at step S2), the processing moves to step S4.

The operation unit 12 next determines whether or not an input that indicates the range of the positional information of the print unit 14 (the image processing device 10) which is permitted to print the document information is received (step S4). When the input that indicates the range of the positional information is received ("Yes" at step S4), the communication unit 13 obtains information indicating the range of the positional information from the operation unit 12 and associates the information of the range of the positional information with the document information as administration information (step S5). When the input that indicates the range of the positional information is not received ("No" at step S4), the processing moves to step S6.

The operation unit 12 next determines whether or not the input of specifying confidential information is received (step S6). When the input of specifying confidential information is received ("Yes" at step S6), the communication unit 13 obtains the confidential information from the operation unit 12 and associates the confidential information with the document information as administration information (step S7). When the input of specifying confidential information is not received ("No" at step S6), the processing moves to step S8.

The communication unit 13 next transmits the document information read out by the reading unit 11 to the server device 20 and, when administration information is associated with the document information, associates the administration information with the document information to transmit it to the server device 20 (step S8).

Figure 7:
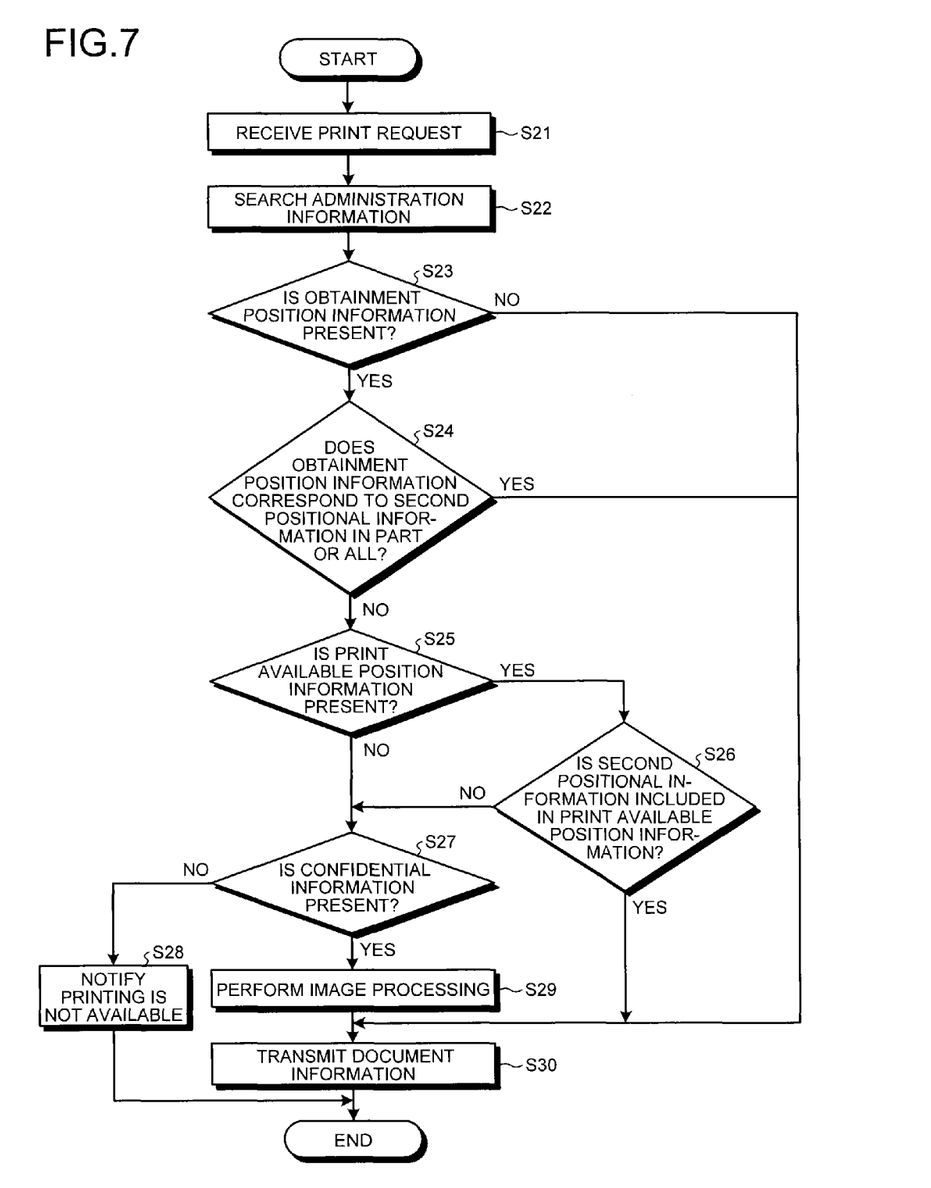
FIG. 7 is a flowchart of an example of a processing in printing a document according to the first embodiment.

FIG. 7 is a flowchart of an example of a processing in printing a document according to the first embodiment. The communication unit 21 receives a print request including the information identifying the document information as a print target and the second positional information indicating the position of the print unit 14 (the image processing device 10) that prints the document information (step S21). The determination unit 23 searches document identifying information of the administration information based on the information, received from the communication unit 21, identifying the document information as a print target and obtains the searched administration information (obtainment position information, print available position information, and confidential information) (step S22).

Next, the determination unit 23 determines whether or not obtainment position information is present in the searched administration information (step S23). When obtainment position information is present in the administration information ("Yes" at step S23), the processing moves to step S24. When obtainment position information is not present in the administration information ("No" at step S23), the determination unit 23 permits the printing and the processing moves to step S30.

Next, the determination unit 23 determines whether or not a part or all of the second positional information indicating the position of the print unit 14 that prints the document information matches with a part or all of the obtainment position information (step S24). When there is no matching in a part or all ("No" at step S24), the processing moves to step S25. When there is a matching in a part or all ("Yes" at step S24), the determination unit 23 permits the printing and the processing moves to step S30.

Next, the determination unit 23 determines whether or not print available position information is present in the searched administration information (step S25). When print available position information is present in the searched administration information ("Yes" at step S25), the processing moves to step S26. When print available position information is not present in the searched administration information ("No" at step S25), the determination unit 23 does not permit the printing and the processing moves to step S27.

Next, the determination unit 23 determines whether or not the second positional information of the print unit 14 that prints the document information is included in the print available position information (step S26). When the second positional information is not included ("No" at step S26), the determination unit 23 does not permit the printing and the processing moves to step S27. When the second positional information is included ("Yes" at step S26), the determination unit 23 permits the printing and the processing moves to step S30.

Next, the determination unit 23 determines whether or not confidential information is present in the searched administration information (step S27). In other words, the determination unit 23 determines whether or not a part whose printing is not permitted in the document information can be specified as confidential information. When no confidential information is present ("No" at step S27), the notifying unit 25 notifies the image processing device 10 and a terminal of a manager of the image processing system 100 of the information of the print request in response to which the printing is not permitted (step S28). When confidential information is present ("Yes" at step S27), the image processing unit 24 performs an image processing by which the confidential information is made unidentifiable (step S29).

The communication unit 21 transmits the document information as a print target to the image processing device 10 (step S30). When the determination unit 23 does not permit the printing of the document information ("No" at step S25 and "No" at step S26) and confidential information is specified in the document information, the communication unit 21 transmits, to the image processing device 10, the document information on which the image processing is performed so that the confidential information is made unidentifiable.

Figure 8:
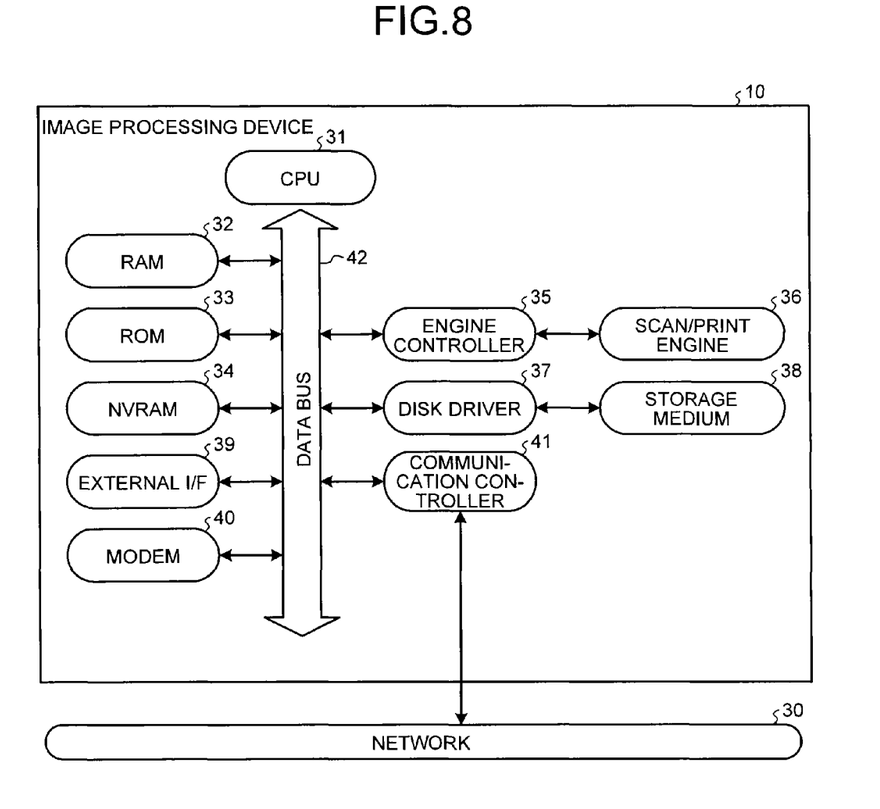
FIG. 8 illustrates an example of a hardware configuration of the image processing device according to the first embodiment.

Finally, a hardware configuration of the image processing system 100 (the image processing device 10 and the server device 20) according to the first embodiment will be explained. FIG. 8 illustrates an example of a hardware configuration of the image processing device 10 according to the first embodiment. The image processing device 10 according to the first embodiment is provided with a central processing unit (CPU) 31, a random access memory (RAM) 32, a read only memory (ROM) 33, a non volatile RAM (NVRAM) 34, an engine controller 35, a scan/print engine 36, a disk driver 37, a storage medium 38, an external I/F 39, a modem 40, and a communication controller 41. The CPU 31, the RAM 32, the ROM 33, the NVRAM 34, the engine controller 35, the disk driver 37, the external I/F 39, the modem 40, and the communication controller 41 are connected to each other via a data bus 42.

The CPU 31 controls a behavior of the image processing device 10. The RAM 32 is a temporal storage area and the stored content is erased when the power source of the image processing device 10 is turned off. The ROM 33, which is a read-only storage area, stores program, font, and other static data and the stored content is maintained when the power source of the image processing device 10 is turned off. The NVRAM 34 stores setting information and the like of the image processing device 10 and the stored content is maintained when the power source of the image processing device 10 is turned off. The engine controller 35 controls a behavior of the scan/print engine 36. The scan/print engine 36, which serves as a unit of inputting and outputting image data, scans a document and performs printing onto transfer paper. The disk driver 37 controls a behavior in writing in the storage medium 38 and reading out data. The storage medium 38 is a storage area for a large amount of image data and a database. The external I/F 39 communicates with other devices by using an interface such as the Centronics interface. The modem 40 is connected to a public telephone infrastructure and communicates with other devices. The communication controller 41 is connected to the network 30 via the Ethernet®, a wireless LAN, and the like and communicates with other devices connected to the network 30.

Figure 9:
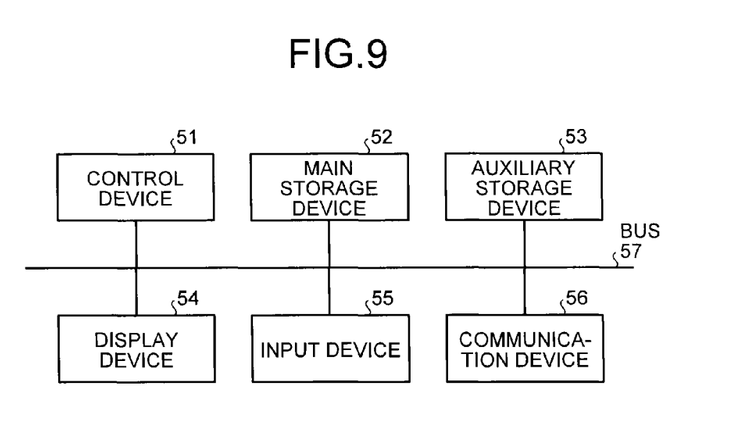
FIG. 9 illustrates an example of a hardware configuration of the server device according to the first embodiment.

FIG. 9 illustrates an example of a hardware configuration of the server device 20 according to the first embodiment. The server device 20 according to the first embodiment is provided with a control device 51, a main storage device 52, an auxiliary storage device 53, a display device 54, an input device 55, and a communication device 56. The control device 51, the main storage device 52, the auxiliary storage device 53, the display device 54, the input device 55, and the communication device 56 are connected to each other via a bus 57.

The control device 51 executes a program read out from the auxiliary storage device 53 to the main storage device 52. The main storage device 52 is a memory such as a ROM and a RAM. The auxiliary storage device 53 is a hard disk drive (HDD), a memory card, and the like. The display device 54 displays a state of the server device 20 and the like. The input device 55 receives an input from a user. The communication device 56 is an interface for connection to the network 30.

A program to be executed in the server device 20 according to the first embodiment is provided, as a computer program product, by being recorded in a file of an installable format or of an executable format in a computer-readable recording medium such as a CD-ROM, a memory card, a CD-R, and a digital versatile disk (DVD).

The program to be executed in the server device 20 according to the first embodiment may be provided by being stored on a computer connected to a network such as the Internet and downloaded via the network. Besides, the program to be executed in the server device 20 according to the first embodiment may be provided without being downloaded via a network such as the Internet.

The program to be executed in the server device 20 according to the first embodiment may be provided by being preloaded in a ROM and the like.

The program to be executed in the server device 20 according to the first embodiment has a module configuration including the functional blocks explained above (the communication unit 21, the determination unit 23, the image processing unit 24, and the notifying unit 25). As an actual hardware, the control device 51 reads out and executes a program from the storage medium, so that each of the functional blocks is loaded on the main storage device 52. In other words, each of the functional blocks is generated on the main storage device 52.

A part or all of the components (the communication unit 21, the determination unit 23, the image processing unit 24, and the notifying unit 25) may be realized by hardware such as an integrated circuit (IC) without realizing them by software.

As explained so far, the image processing system 100 according to the first embodiment permits printing of document information when the determination unit 23 determines that a part or all of the first positional information of the reading unit 11 that read out the document information matches with a part or all of the second positional information of the print unit 14 that prints the document information. Since document information cannot thus be printed in an arbitrary image processing device 10, it is possible to suppress a risk for a leakage of confidential information included in the document information.

Second Embodiment

An image processing system 100 according to a second embodiment will be explained next. In the second embodiment, a situation of realizing the image processing device 10 according to the first embodiment by a main body unit 1 and an operation unit 12, which will be explained later, will be explained.

Figure 10:
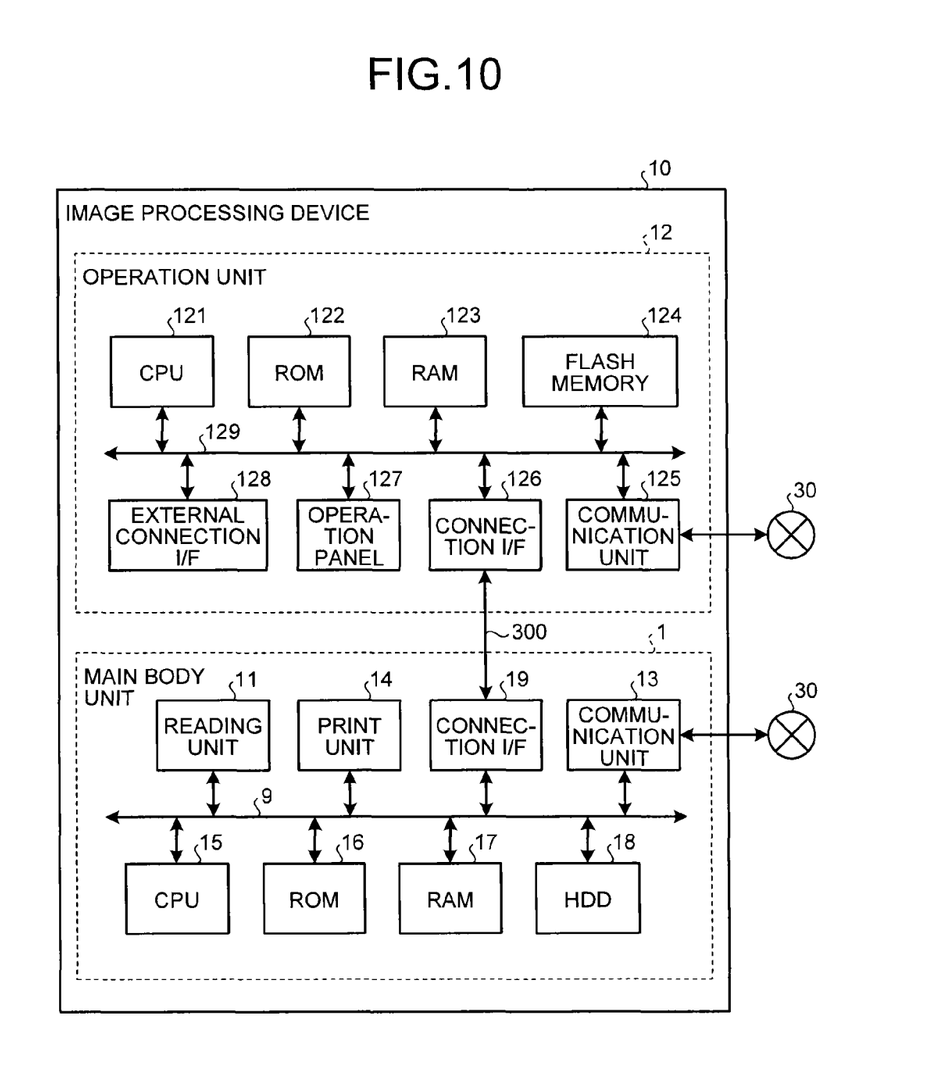
FIG. 10 illustrates a hardware configuration of an image processing device according to a second embodiment.

FIG. 10 illustrates an example of a hardware configuration of an image processing device 10 according to a second embodiment. As illustrated in FIG. 10, the image processing device 10 is provided with the main body unit 1 and the operation unit 12. The main body unit 1 realizes various kinds of functions including a copying function, a scanning function, a facsimile function, a printing function, and the like. The operation unit 12 receives information in accordance with an operation by a user. Here, the information in accordance with an operation by a user is, for example, a signal indicating coordinate values in a screen and the like.

The main body unit 1 and the operation unit 12 are connected to each other via a connection I/F 19, a dedicated communication channel 300, and a connection I/F 26 in such a manner that a communication therebetween is allowed. While a universal serial bus (USB) standard may be used for the communication channel 300, for example, an arbitrary standard irrespective of being wired or wireless may be used.

The main body unit 1 performs a behavior in accordance with an operation received by the operation unit 12. The main body unit 1 is capable of communicating with an external device such as a PC and performing a behavior in accordance with an instruction (print instruction and the like) received from the external device.

A hardware configuration of the main body unit 1 will be explained first. As illustrated in FIG. 10, the main body unit 1 is provided with a reading unit 11, a communication unit 13, a print unit 14, a CPU 15, a ROM 16, a RAM 17, an HDD 18, and the connection I/F 19. The reading unit 11, the communication unit 13, the print unit 14, the CPU 15, the ROM 16, the RAM 17, the HDD 18, and the connection I/F 19 are connected to each other via a system bus 9.

The reading unit 11 is a hardware that performs a processing to realize a copying function, a scanning function, and a facsimile function. The reading unit 11 is provided with a scanner and the like that scan and read out an image of a document, for example.

The communication unit 13 is an interface for a connection to a network 30.

The print unit 14 is a hardware that performs a processing to realize a printing function. The print unit 14 is provided with a plotter and the like that perform printing onto a sheet material such as paper, for example. The print unit 14 is further provided with a hardware that enables realizing special options such as a finisher that sorts printed sheet members and an automatic document feeder (ADF) that automatically feeds a document.

The CPU 15 totally controls a behavior of the main body unit 1. The CPU 15 uses the RAM 17 as a work area (work space) and executes programs stored in the ROM 16 or the HDD 18 to control an entire behavior of the main body unit 1 and realize various functions including the copying function, the scanning function, the facsimile function, the printing function, and the like.

The connection I/F 19 is an interface that enables a communication with the operation unit 12 via the communication channel 300.

A hardware configuration of the operation unit 12 will be explained next. As illustrated in FIG. 10, the operation unit 12 is provided with a CPU 121, a ROM 122, a RAM 123, a flash memory 124, a communication unit 125, a connection I/F 126, an operation panel 127, and an external connection I/F 128. The CPU 121, the ROM 122, the RAM 123, the flash memory 124, the communication unit 125, the connection I/F 126, the operation panel 127, and the external connection I/F 128 are connected to each other via a system bus 129.

The CPU 121 totally controls a behavior of the operation unit 12. The CPU 121 uses the RAM 123 as a work area (work space) and executes programs stored in the ROM 122 or the flash memory 124 to control an entire behavior of the operation unit 12 and realize a display of information (image) in accordance with an input received from a user.

The communication unit 125 is an interface that enables a connection to the network 30. The connection I/F 126 is an interface that enables a communication with the main body unit 1 via the communication channel 300.

The operation panel 127 receives inputs of various kinds in accordance with operations by a user and displays information of various kinds (information in accordance with the received operation, information indicating an operational status of the image processing device 10, and information indicating a setting condition, for example). While the operation panel 127 is configured by a liquid crystal display (LCD) device equipped with a touch sensitive panel function, the configuration is not limited thereto. For example, the operation panel 127 may be configured by an organic EL display device equipped with the touch sensitive panel function. The operation unit 12 may further be provided, as a user interface, with a display unit such as a hardware key (button) and a lamp.

The external communication I/F 128 is an interface such as a near field communication (NFC) used for connecting to other devices such as a smart device.

Since being the same as the image processing device 10 according to the first embodiment (see FIG. 2), a detailed operation method of the reading unit 11, the operation unit 12, the communication unit 13, and the print unit 14 is not explained here. Besides, since being the same as the server device 20 according to the first embodiment (see FIG. 4), the server device 20 is not explained here. Since being the same as the image processing method of the image processing system 100 according to the first embodiment (see FIGS. 6 and 7), an image processing method of an image processing system 100 according to the second embodiment is not explained here.

As explained so far, the hardware of the main body unit 1 is independent from the hardware of the operation unit 12 in the image processing device 10 according to the second embodiment. The image processing device 10 according to the second embodiment has thus an advantage in cost associated with development and in management of setting data associated with an image processing and of updating of programs.

According to an embodiment, there is an advantage in suppressing a risk for a leakage of confidential information included in document information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
a server device; and
an image processing device connected to the server device via a network, wherein
the image processing device includes
a reading unit that reads out a document to obtain document information; and
a print unit that prints the document information, and
the server device includes
a storage unit that stores the document information and first positional information in association with each other, the first positional information indicating a position of the reading unit that has read out the document information;
a communication unit that receives a print request including information for identifying the document information and second positional information that indicates a position of the print unit that prints the document information; and
a determination unit that permits printing of the document information when at least a part of the first positional information matches with at least a part of the second positional information.

2. The image processing system according to claim 1, wherein
the image processing device further includes an operation unit that receives an input that indicates whether to associate the first positional information with the document information, and
the determination unit permits printing of the document information when the first positional information is not stored in association with the document information in the storage unit.

3. The image processing system according to claim 2, wherein
the operation unit further receives an input that indicates a range of positional information of the print unit that is permitted to print the document information,
the storage unit further stores the range of the positional information of the print unit in association with the document information, and
the determination unit determines whether to permit the printing based on the range of the positional information of the print unit and the second positional information.

4. The image processing system according to claim 2, wherein the server device further includes:
a notifying unit that notifies the operation unit or a terminal of a manager of the image processing system of information of the print request in response to which printing is not permitted when the determination unit does not permit the printing of the document information.

5. The image processing system according to claim 2, wherein
the operation unit further receives an input of specifying confidential information that indicates information corresponding to a part whose printing is not permitted in the document information,
the storage unit further stores the confidential information in association with the document information, and
the print unit performs printing in a way that an identification of the confidential information included in the document information is disabled when the determination unit does not permit the printing.

6. The image processing system according to claim 1, wherein the document is a business card.

7. An image processing method performed in an image processing system that includes a server device and an image processing device connected to the server device via a network, the image processing method comprising:
- reading out a document to obtain document information by a reading unit of the image processing device;
- storing, in a storage unit of the server device, the document information and first positional information in association with each other, the first positional information indicating a position of the reading unit that has read out the document information;
- printing the document information by a print unit of the image processing device;
- receiving, by a communication unit of the server device, a print request including information for identifying the document information and second positional information that indicates a position of the print unit that prints the document information; and
- permitting, by a determination unit of the server device, the printing of the document information when at least a part of the first positional information matches with at least a part of the second positional information.

* * * * *